(12) United States Patent
Germain (10) Patent No.: US 8,092,144 B2
(45) Date of Patent: Jan. 10, 2012

(54) METHOD AND INSTALLATION FOR ASSEMBLING PALLETIZABLE PRODUCTS

(75) Inventor: Dominique Germain, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 76 days.

(21) Appl. No.: 12/279,130

(22) PCT Filed: Feb. 12, 2007

(86) PCT No.: PCT/FR2007/000239
§ 371 (c)(1),
(2), (4) Date: Aug. 12, 2008

(87) PCT Pub. No.: WO2007/093694
PCT Pub. Date: Aug. 23, 2007

(65) Prior Publication Data
US 2009/0010749 A1    Jan. 8, 2009

(30) Foreign Application Priority Data

Feb. 13, 2006  (FR) ...................................... 06 01220

(51) Int. Cl.
*B65G 57/22*  (2006.01)
*B65G 47/26*  (2006.01)
(52) U.S. Cl. .................. 414/792.6; 414/794.7; 198/431; 198/459.8
(58) Field of Classification Search ............... 198/418.5, 198/431–432, 459.1, 459.8, 460.1, 460.3, 198/461.1, 850–851; 414/791.8, 792.6, 794.7, 414/907, 791.6; 700/217
See application file for complete search history.

(56) References Cited

U.S. PATENT DOCUMENTS

| | | | | |
|---|---|---|---|---|
| 1,418,658 A | * | 6/1922 | Ladd | 414/791.8 |
| 2,997,187 A | * | 8/1961 | Burt | 414/791.4 |
| 3,056,513 A | * | 10/1962 | Von Gal, Jr. | 414/792.6 |
| 3,241,689 A | * | 3/1966 | Verrinder | 414/792.6 |
| 3,901,391 A | * | 8/1975 | Carlson et al. | 414/792 |
| 3,918,575 A | | 11/1975 | Carlson et al. | |
| 3,934,712 A | * | 1/1976 | Jende | 198/834 |

(Continued)

FOREIGN PATENT DOCUMENTS

EP     0 221 408 A1    5/1987

(Continued)

*Primary Examiner* — Gregory Adams
(74) *Attorney, Agent, or Firm* — Sughrue Mion, PLLC (57) ABSTRACT

The invention concerns a method which consists in cyclically: transferring a first row of products (3) between the station for preparing said products (6) and the pre-assembly station (7), at a speed V; transferring similarly a second row of products (3) onto said pre-assembly table (7), and in order to manage the docking of said second row with the row of products already set on said pre-assembly table (7), moving said set row at a speed v selected between zero and V, depending on the type or products (3); transferring, as the case may be, another row of products (3) onto the table (7), and, when the number of rows is reached to obtain said layer, transferring said layer onto the setting table (13) of the palletizing station (14). The installation comprises transfer means consisting of pushers (25) and (26) mobile between different stations, driven at suitable speeds. The invention also concerns, at the pre-assembly station (7), a modular endless belt which is supported and moves on a slider bed, said belt being mobile, driven at a speed which is related to that of the pushers (25) and (26).

20 Claims, 4 Drawing Sheets

U.S. PATENT DOCUMENTS

| | | | |
|---|---|---|---|
| 4,190,146 A * | 2/1980 | Knuchel | 198/460.1 |
| 4,231,697 A | 11/1980 | Franz | |
| 4,439,084 A | 3/1984 | Werkheiser | |
| 5,228,558 A | 7/1993 | Hall | |
| 5,383,760 A * | 1/1995 | Cawley et al. | 414/791.6 |
| 5,522,692 A * | 6/1996 | Simkowski | 414/789.5 |
| 5,758,471 A | 6/1998 | Denley et al. | |
| 6,897,625 B2 * | 5/2005 | Brixius et al. | 318/69 |
| 6,986,420 B2 * | 1/2006 | Weiser et al. | 198/853 |
| 2004/0134754 A1 * | 7/2004 | Grafer et al. | 198/465.1 |

FOREIGN PATENT DOCUMENTS

EP 452560 A1 * 10/1991

* cited by examiner

METHOD AND INSTALLATION FOR ASSEMBLING PALLETIZABLE PRODUCTS

The present invention relates to a method for assembling products in order to perform palletization thereof; it also relates to an installation for implementing said method.

It is entirely possible nowadays to palletize products automatically, i.e. fully load products onto a pallet without human assistance. The technology in this sector of product palletization is such that it is possible to form layers of products and arrange them in succession directly on the pallet.

An installation of this kind is described in the document U.S. Pat. No. 4,439,084; said installation deals with the palletization of articles which are relatively uniform and which in particular are not fragile, such as bundles of newspapers.

Automatic palletization nowadays involves all kinds of products and it is obvious that the slightest problem arising during formation of the layers and arrangement thereof on the pallet may have serious repercussions and consequences for the entire load. Thus, for example, a container or bottle which breaks, during this layer formation or palletization operation, may soil the entire pallet and make all the products unfit for sale. Said soiling may also affect the entire palletization installation, fouling the belts, rollers and other transfer systems in this installation.

Similarly, products which are incorrectly positioned within the layer may create, depending on their position in the loading layout, a more or less significant imbalance on the pallet, with consequences which can be easily imagined, such as disorder from the layer affected, and even the risk of the said load collapsing at any time. This problem arises, for example, with products such as packs of plastic bottles, owing to the form of these bottles which have a base consisting not of a flat surface but of several support points; these products are not very stable in space; they easily lose their equilibrium and tend to oscillate and/or sway whenever they are moved in whatsoever manner. Moreover, in the event of an impact, they may be displaced with respect to each other and, instead of being arranged in line, may assume a staggered arrangement.

This operation of preparing the layers of products in order to perform palletization thereof therefore proves to be a particularly delicate operation; the successful outcome thereof determines on the value of the load whatever the nature of the products. A pallet which is delivered with products in an altered state is most likely to be refused by the recipient. This is therefore a great cause for concern and a major responsibility for the person who has the task of performing palletization.

The present invention proposes a palletization method and installation which are able to ensure better than normal results, eliminating the conventional risks of breakage and incorrect positioning of the products during this crucial operation of forming the layer to be palletized but also during the operation involving transfer of the layer to the palletization table.

The present invention also proposes a material which, in the event of breakage of a container/bottle or number of containers/bottles, avoids soiling the other products and the palletization installation.

As a result of the improvements provided by the invention it is also possible to increase significantly the palletization speeds by about 10 to 15%.

The assembly method according to the invention, for products palletizable in layers, with layers consisting of several rows of products, consists in cyclically:

transferring a first row of products between the product feeding station and the preassembly station at a speed $\overline{V}$;

transferring in the same way a second row of products onto the preassembly station and, in order to manage docking of the second row next with the row of products already in position on the said preassembly station, moving the said row in position at a speed v chosen between zero and $\overline{V}$, depending on the type of product and in particular their stability and/or their capacity to withstand the docking impacts, this movement of the row in position on the preassembly station essentially consisting in an escape movement in order to avoid too sudden an impact during docking of the second row;

transferring, as required, another row of products onto the preassembly station, again at the speed $\overline{V}$, and moving the rows already in position, as above, at a speed v between zero and $\overline{V}$ in order to manage the docking movement and, when the number of rows is reached in order to obtain the said layer, transferring the said layer to the palletization station, on the deposition station.

Still according to the invention, the assembly method consists in transferring the formed layer, between the preassembly station and the deposition table, by applying a combination of two movements:

an advancing movement which is performed directly by means of the support for the said layer at the said preassembly station at a speed v' chosen between zero and $\overline{V}$, depending on the products and their capacity to withstand impacts, and a transfer movement, performed at the same time as the previous movement and effected by means of a suitable pusher device at a speed $\overline{V}'$ equal to about V to 1.2 V.

According to another arrangement of the invention, the assembly method may also involve, before transfer of the products between the supply station and the preassembly station, a prior stage involving preparation of the said products which consists in positioning them and/or orienting them by placing some of them at right angles in relation to others, in accordance with the palletization layout.

The invention also concerns the installation for implementing the method as described above, said installation comprising:

one preparation station, at least, which receives the products to be palletized arriving from a sorting conveyor;

a preassembly station where the products are arranged in a row or rows on a table which is able to receive the number of rows of products forming the palletizable layer;

a palletization station where deposition of the layer is performed and where, by means of suitable complementary means, stacking of the different layers of products is performed so as to form a pallet;

means for transferring the products arranged in rows, or in layers, from one station to another;

means for monitoring and measuring the position of the said transfer means;

means for adjusting and synchronizing the transfer speeds of the said products and managing them, depending on the information provided by the said monitoring and measuring means and in accordance with criteria characteristic of these products such as their capacity to remain stable in space and their capacity to withstand impacts when the rows of products are docked next to each other.

Still according to the invention, the transfer means consist of pushers:

a pusher for the rows of products, which pusher is movable between the preparation station and the preassembly station; and a pusher for the formed layers, which pusher is movable between the said station for preassembly and the station for palletization of the layer.

which pushers are retractable heightwise so as to move above the said rows during their return travel movement.

According to another arrangement of the invention, the preassembly station has a motor-driven endless belt with suitable means of the asynchronous motor type which allow management of its speed during the transfers, which speed is determined depending on the information provided by the monitoring and measuring means and is chosen depending on the nature of the products to be assembled and in particular on their capacity to remain stable in space and their capacity to withstand impacts when docked next to other rows.

Still according to the invention, the preassembly station comprises a flat bed on which the upper section of the endless belt rests and travels so as to offer the products a surface which is perfectly flat providing them with a very high stability and adequate grip such that they may be conveyed by this belt, this station also having, at its entry point, a trigger cell type sensor which controls the passing movement of the pushers.

According to another arrangement of the invention, the endless belt of the preassembly station is a belt of the modular type made of thermoplastic material, which belt is composed of bar sections, which bar sections are hinged about spindles which extend transversely with respect to the feeding direction. The outer surface of this belt, which receives and supports the products, is a continuous, flat and uniform surface suitable for ensuring the stability of the products; as a result of said surface the products are able to retain their equilibrium whatever the form of their base during transfer thereof. Moreover this belt is permeable so as to allow liquids to flow through and be removed in the event of accidental cracking or breakage of the products prior to their arrival at the preassembly station.

Still according to the invention, the endless belt has, on its inner surface, toothing which is formed around the hinging spindles of the bar sections over about half the thickness of the latter, which toothing allows the said belt to be wound around smooth small-diameter rollers, of the "saber blade" type, situated at the ends of the preassembly table and driving of the said belt is performed by means of a driving member in the form of a meshing drum on which it is wound over about half of the circumference by means of a tensioning roller, which notched drum has a diameter in the region of ten times the pitch of the said toothing, thereby allowing precise and efficient driving of the said belt so as to move the products and manage the docking of these products next to each other during the formation of the layer to be palletized.

According to another arrangement of the invention, the preparation station consists of a table formed by small-diameter motor-driven rollers, which table is arranged at the end of the product sorting conveyor and is provided with pivots and/or travel stops which allow orientation and/or spacing or fixing of the said products in their position in the layer, which position is determined by the palletization layout.

However, the invention will be explained in more detail with the aid of the following description and the accompanying drawings which are provided by way of example and in which.

Figures 1, 18:
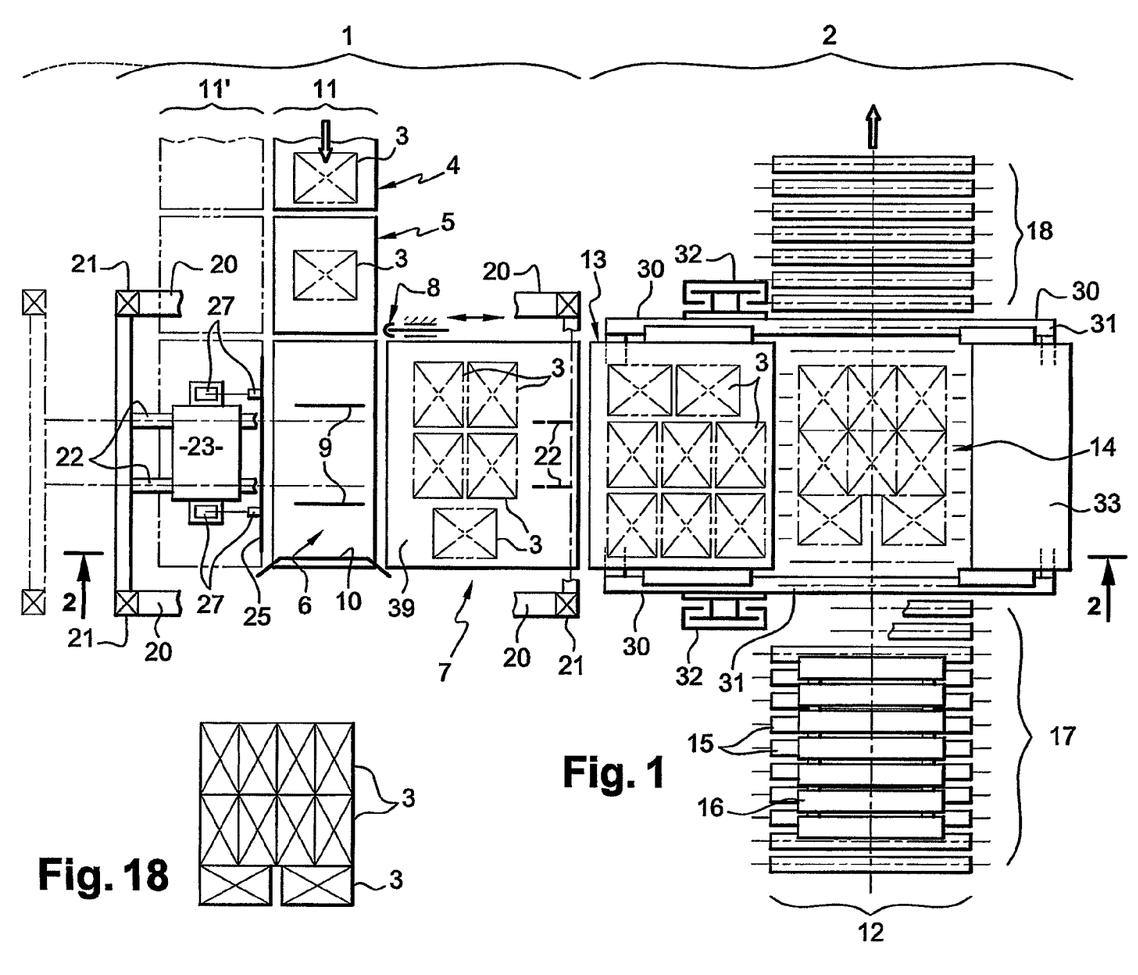
FIG. 1 is a schematic plan view of the palletization installation according to the invention.
FIG. 18 shows a variation of arrangement of the products in a layer to be palletized.

As shown in FIG. 1, the installation is composed of two main separate zones: the zone (1) which deals with the preparation and preassembly of the products and a zone (2) which deals with the palletization of the layers of products.

The zone (1) comprises a line (11) for feeding in the products (3) which is composed of: a conveyor (4) for supplying and collecting together the said products (3); a sorting conveyor (5); a preparation station (6); and a station (7) for preassembling the said products (3).

The collection conveyor (4) is a conventional conveyor of the motor-driven endless belt type as is the sorting conveyor (5). The preparation station (6) consists of a table with small-diameter motor-driven rollers. This preparation station is equipped with a pivot or pivots (8) for orienting the products, travel stops (9) for separating them and an end stop (10) which defines the end point of this line supplying the products (3).

The preassembly station (7) comprises a table which is arranged transversely downstream of the preparation station (6). This station (7) will be described in more detail further below in connection with FIGS. 3 to 5.

The zone (2) comprises: a line (12) which is parallel to the line (11) supplying the products (3) and a retractable table (13) which joins together the preassembly station (7) and the actual palletization station (14) which is situated on the said line (12).

The line (12) consists of motor-driven rollers (15) on which the pallets (16) are conveyed. The pallets (16) move, on the one hand, between the station (17) where they are stored empty and the palletization station (14) where they receive the layers of products (3) and, on the other hand, between the said palletization station (14) and the discharge station (18) where they are discharged after being loaded.

Figure 2:
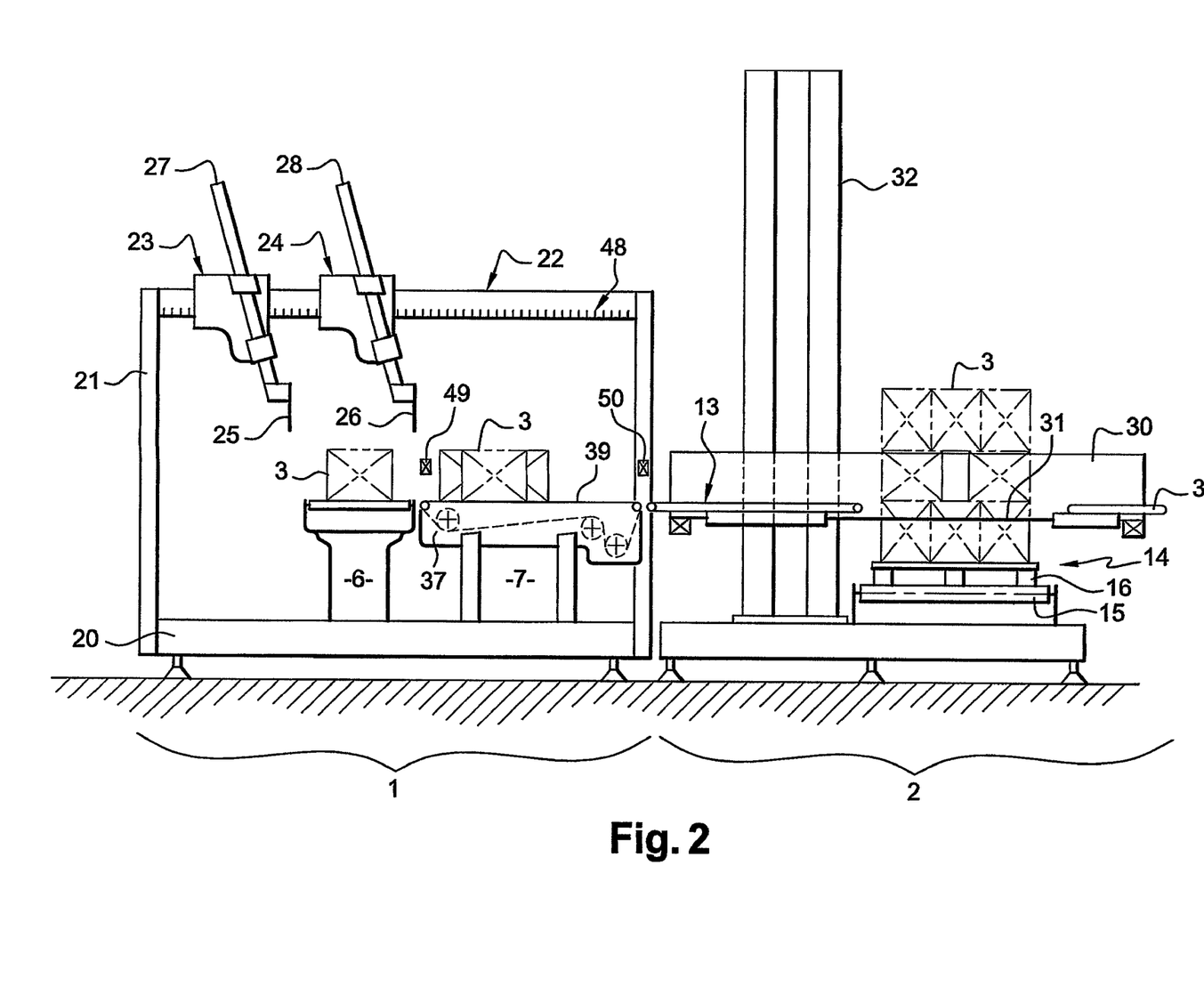
FIG. 2 is a cross-section through FIG. 1 along the line 2-2.

The two zones (1) and (2) are also shown in FIG. 2 which is a schematic elevation view of the installation. FIG. 2 shows the preassembly station (7) which is preceded by the preparation station (6). The stations (6) and (7) are mounted on a frame (20) and this frame supports a gantry (21) which supports slides (22) on which the means which allow transfer of the products from one station to another are mounted: on the one hand, from the preparation station (6) to the preassembly station (7) and, on the other hand, from the said station (7) to the retractable table (13) which supplies the palletization station (14).

The transfer means consist of two carriages (23) and (24) mounted on the slides (22). These two slides (22) are arranged perpendicularly with respect to the line (11) feeding in the products (3).

Each carriage (23), (24) has a pusher (25), (26), respectively, and each pusher is arranged at the bottom end of a pair of arms (27), (28), respectively. Asynchronous motor or linear motor means are envisaged for managing the movements of each carriage and the movements of the corresponding pushers.

Only the carriage (23), together with its pusher (25), is shown in FIG. 1, mounted on the pair slides (22).

Thus, as shown in FIG. 1, the products (3), which are supplied and collected together on the conveyor (4), pass onto the sorting conveyor belt (5), which belt delivers the said products (3) onto the preparation station (6).

When they are positioned correctly, at the station (6), the products (3) are transferred, by means of the pusher (25) of the carriage (23), from this station (6) to the preassembly station (7). With a few operations a layer of products (3) is formed and this layer is transferred, by means of the pusher (26), from the station (7) to the table (13), which table (13), described in detail below, then deposits the said layer on the pallet (16) at the palletization station (14).

This table (13) is mounted on a frame (30) and is movable on slides (31) which extend above the line (12). The frame (30) is movable vertically, guided by uprights (32), so as to bring the table (13) to the level where unloading of the products (3) onto the pallet is performed.

Briefly, the retractable table (13) is formed by first part—indicated by 13—the surface of which corresponds substantially to that of the table of the preassembly station (7), and by a second part (33), the surface of which is about half that of the said table (13); these two tables (13) and (33) are guided on the same slides (31) and are moved towards each other by suitable means so as, on the one hand, to close the space above the pallet to be loaded and, on the other hand, to allow transfer of some of the products (3) from the said table (13) onto the table (33); then the layer is strapped and held by means of spacer blocks, not shown, while the tables (13) and (33) are retracted, allowing the products (3) of the said layer to be deposited by means of simple gravity onto the said pallet while continuing to be guided by the said spacer blocks.

During the operation where the layer of products (3) is deposited on the pallet (16) or on the layer already in position, another layer is prepared at the preassembly station (7). This preassembly station (7) is shown in more detail in FIG. 3.

Figure 3:
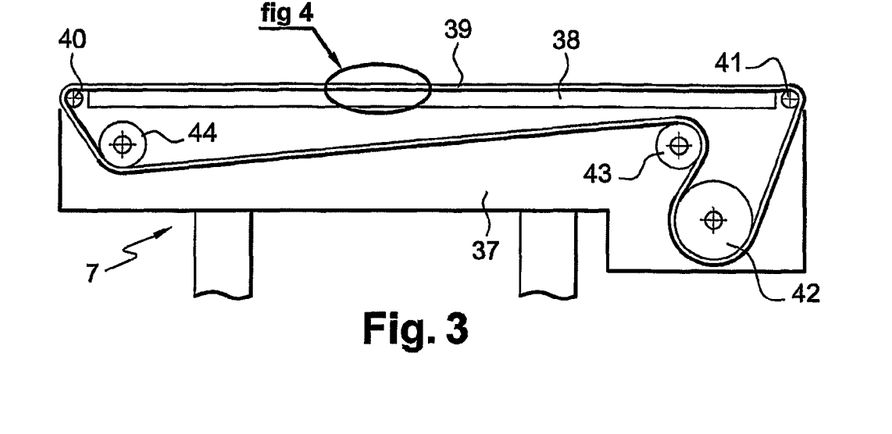
FIG. 3 shows a schematic elevation view of the preassembly table.

This station comprises a frame (37) which supports a horizontal bed (38). This bed (38) acts as a guiding and support surface for an endless belt (39) which is tensioned between rollers (40) and (41) situated at the ends of the preassembly station (7). These rollers (40) and (41) are of the "saber blade" type; they have a very small diameter in order to facilitate transfer of the products (3) from one station to another. The roller (40) is situated on the side where the preparation table (6) is located and the roller (41) is situated on the side where the retractable table (13) is located.

The belt (39) is driven by a drive member in the form of a drum (42) situated downstream of the roller (40) and is tensioned by two other rollers (43) and (44). The roller (43) which is situated downstream of the drum (42) also has the function of winding the belt (39) around half of the periphery of the said drum (42).

The belt (39) is of the modular type, made of thermoplastic material. It is shown in a side view (see FIG. 4) and in a plan view (see FIG. 5). It is composed of crenellated bar sections (45) which fit together and are assembled and hinged with each other by means of spindles (46). The outer surface of the bar sections (45) is flat and assembly of these bar sections is such that, generally, the overall support surface for the products is very uniform and flat. This surface is well-suited for all types of products (3) and in particular for packs of plastic bottles which have a tulip-shaped base.

Figure 4:
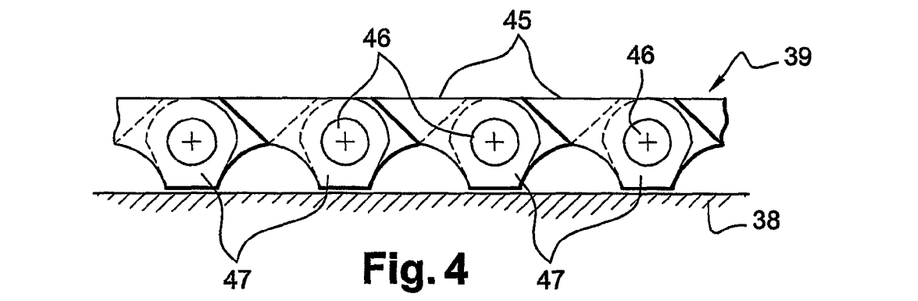
FIG. 4 shows, in detail, a portion of the endless belt of the table shown in FIG. 3.
Figure 5:
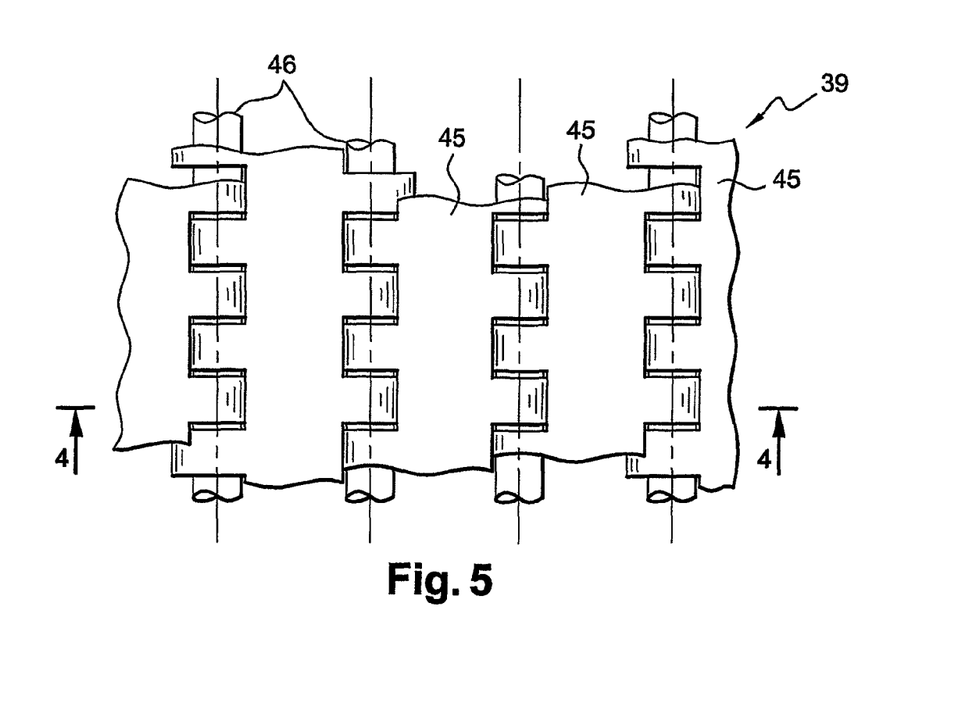
FIG. 5 shows a top plan view of a portion of the endless belt shown in FIG. 4.

This uniform surface ensures better seating of the products and improves the stability of these packs. This belt also has the advantage of being permeable so as to allow the removal of liquid in the event of breakage. The bed (38) which supports the upper section of the belt (39) may also be designed so as to facilitate the flow and removal of the liquids.

The inner surface of the belt (39) is notched so as to form a toothing (47). Said toothing is formed around the spindles (46) and has a depth which is about half the thickness of the said belt. This toothing (47) meshes with the drum (42), the periphery of which is correspondingly designed. In fact, this drum (42) may also consist of several toothed wheels which are arranged at intervals over the entire width of the belt (39).

Owing to the form of the toothing (47) it is also possible to wind the belt around the end rollers (40) and (41). The diameter of these end rollers may be approximately equal to the pitch of the toothing (47).

The drum (42) is driven by suitable means, such as an asynchronous motor, so as to drive the belt (39) at the desired speed; its diameter is about 10 times the pitch of the toothing (47). By conveying the products (3) which are on the preassembly belt (39) it is possible to manage positioning or docking thereof next to or alongside the products supplied from the preparation station (6) during transfer thereof on the said belt (39) and thus avoid excessively severe impacts.

Adjustment of the speed of the belt (39) is performed by suitable means, of the calculating type, depending on information provided by means for monitoring and measuring the position of the transfer means, i.e. the carriages (23), (24) and the pushers (25), (26).

These monitoring and measuring means are shown in FIG. 2; they consist of sensors, i.e. encoder type sensors (48) which are arranged on the slides (22), and trigger cells (49) and (50) which are arranged in the station (7), i.e. one cell (49) is situated at the entry end of the belt (39) and one cell (50), acting more as a safety component, is situated at the exit end of the said belt (39).

FIGS. 6 to 17 illustrate the different stages of the method for preassembly of the products (3) according to the invention.

Figure 6:
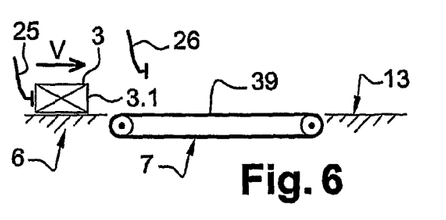
FIGS. 6 to 17 illustrate the method for assembling the products so as to form a layer to be palletized.

FIG. 6 shows the station (6) for preparing the products (3). The product (3.1) is taken up by the pusher (25) so as to be transferred to the station (7) for preassembly on the belt (39). The same FIG. 6 also shows the pusher (26) which is in an inactive standby position and the retractable table (13) is situated downstream of the station (7).

Figure 7:
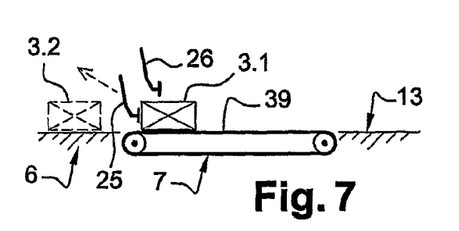

FIG. 7 shows the product (3.1) which is positioned on the preassembly belt (39) and the pusher (25) which is preparing to return into its initial position as shown in FIG. 6, being retracted above the new awaiting product (3.2).

Figure 8:
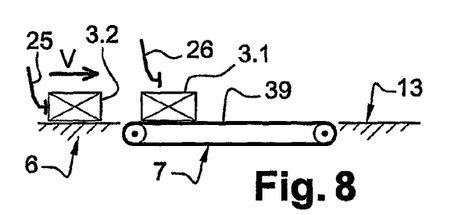

FIG. 8 shows the pusher (25) which takes up the product (3.2) at a speed $\overline{V}$ so as to convey it to the preassembly station (7).

Figure 9:
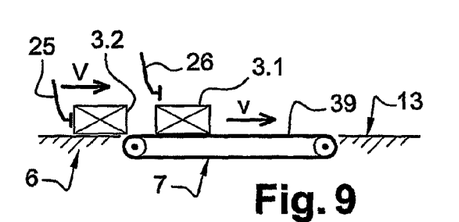

During the movement of the product (3.2), see FIG. 9, the product (3.1) is displaced, through the station (7), by means of the preassembly belt (39) on which it is positioned. The speed v of the belt (39) is chosen depending on the products, their nature and, in particular, their stability and the capacity to withstand the impacts caused by positioning together or docking with the products being supplied. This speed v is between zero and $\overline{V}$, namely the speed of the pusher $(\overline{25})$.

Figure 10:
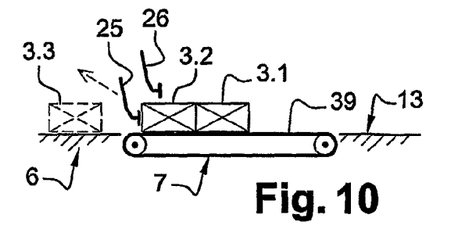
Figure 11:
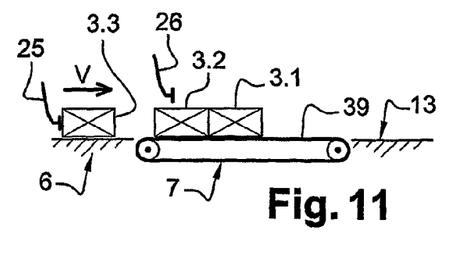
Figure 12:
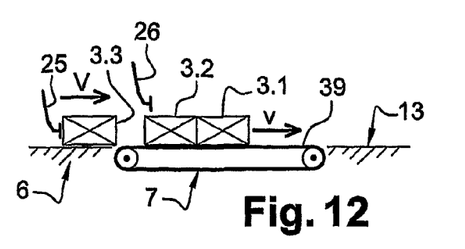

FIG. 10 shows the products (3.1) and (3.2) on the belt (39) of the preassembly station. In this position, the pusher (25) is retracted so as to return into the initial position and take up a new awaiting product (3.3). This product (3.3) is taken up, as shown in FIG. 11, by the pusher (25) at a speed $\overline{V}$ and, as shown in FIG. 12, the products (3.1) and (3.2) which are situated on the belt (39) are conveyed by the said belt, at a speed v, so as to manage positioning next to the new incoming product (3.3), which product (3.3) is pushed at a speed $\overline{V}$ by the pusher (25).

Figure 13:
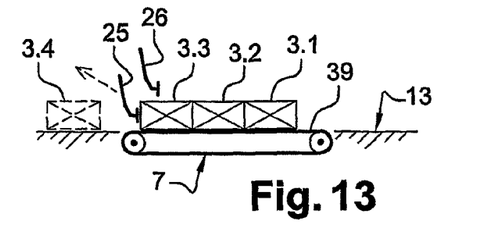

When the three products (3.1, 3.2, 3.3) are assembled on the belt (39) at the preassembly station (7), as shown in FIG. 13, the pusher (25) is retracted and returns into its initial position. At the same time, the pusher (26) assumes the active position in order to take up the three products (3.1, 3.2, 3.3) assembled on the preassembly belt (39).

Figure 14:
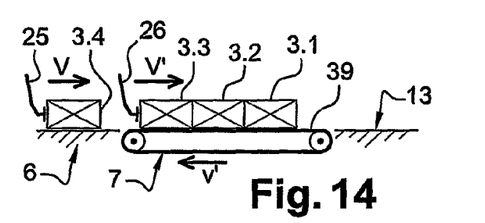

FIG. 14 shows, on the one hand, the pusher (25) in the active position for moving the product (3.4) and, on the other hand, the pusher (26) in the active position for bringing the layer which is formed with the products (3.1, 3.2, 3.3) towards the retractable table (13) of the palletization station (14).

The pusher (25) always moves at a speed V while the pusher (26) is able to move at a slightly faster speed such as, for example, a speed V' equal to about V to 1.2 V.

Still with reference to FIG. 14 it can be seen that the belt (39) may also be moved at a speed v' so as to convey directly the products (3) at the same time as the pusher (26) so as to prevent impacts between them as a result of the said pusher. This speed v' is chosen, as above, depending on the nature of the products (3).

Figure 15:
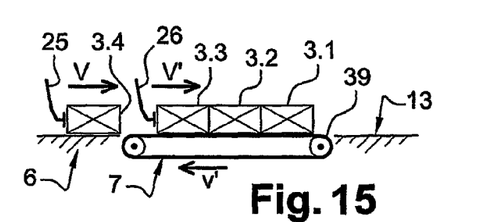

FIG. 15 shows the progression of feeding of the layer of products and the new product (3.4) which is taken up by the pusher (25).

Figure 16:
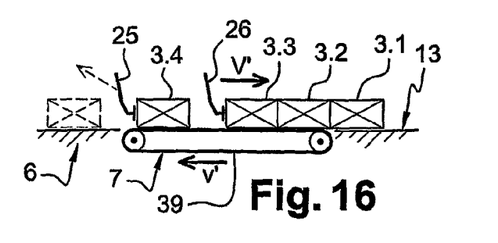

In FIG. 16 it can be seen that the new product (3.4) is positioned on the belt (39) while the pusher (26) is completing transfer of the layer formed on the table (13).

Figure 17:
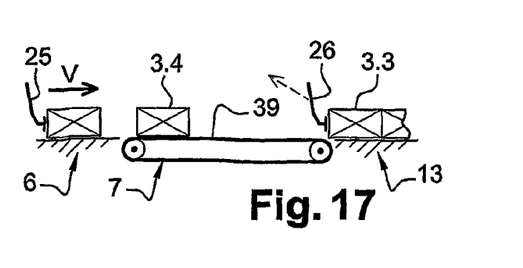

The pusher (25) is retracted again so as to return into its initial position and take up the new product (3.5). At the same time, the pusher (26), which has completed its transfer movement, see FIG. 17, is retracted so as to pass above the product (3.4) and return into its initial position as shown in FIG. 6.

The cycle then resumes from the condition shown in FIG. 8.

This assembly method avoids the downtime occurring during transfer of the layer of products onto the retractable table (13), which retractable table transfers the said layer onto the pallet.

By managing the speeds it is therefore possible to manage docking or positioning of the products next to each other, which products are either in the form of a single unit or as shown in FIG. 1 in the form of rows arranged in succession on the belt (39) of the preassembly table (7).

FIG. 1 shows, arranged on the table (7), two rows of products (3), one of the rows consisting of three products while the other row simply consists of two products. A complete layer of products can be seen on the table (13).

The arrangement of the products, i.e. their orientation, is performed as described above by means of the pivot (8) and the travel stops (9).

FIG. 18 shows a variant of the layer which consists of four rows of products arranged in pairs and two complementary products arranged differently. In order to form a layer of this type it is possible to use, for example, as shown in faint broken lines in FIG. 1, a complementary line (11') supplying the products (3) so as to reassemble five products (3) in one go. With this type of installation it is possible to achieve a notable increase in productivity with speeds which are about ten to fifteen percent higher and in particular achieve an improvement in the conditions for forming the layers of products.

What is claimed is:

1. A method for assembling products palletizable in layers, each layer comprising a number of rows of products, the method comprising cyclically:
   transferring a first row of products from a preparation station for preparing the products into a first position on a preassembly station at a speed V, the transferring of the first row of products being made with a first pusher initially positioned prior to the preparation station, by moving the first pusher to a position above the preassembly station corresponding to a rear of the first row of products positioned at the first position on the preassembly station;
   transferring, with the first pusher, a second row of products from the preparation station onto the first position on said preassembly station at the speed V, while substantially contemporaneously moving said first row of products into a second position on the preassembly station at a speed v chosen between zero and V, depending on at least one of a type of product, a product stability, and a product capacity to withstand docking impacts, to manage docking of the second row of products next to the first row of products already positioned on the preassembly station;
   transferring, as required, with the first pusher, another row of products from the preparation station onto the first position on said preassembly station, at the speed V, and moving the first row of products and the second row of products into a further position on the preassembly station at the speed v of between zero and V, to manage the docking of the another row of products next to the second row of products; and
   when the number of rows of products is reached to obtain a formed layer, transferring the formed layer to a palletization station, on a deposition table, with a second pusher.

2. The method for assembling products palletizable in layers, as claimed in claim 1, further comprising transferring the formed layer, between said preassembly station and said deposition table, by applying a combination of two movements comprising:
   an advancing movement which is performed directly by a support for said formed layer, provided at said preassembly station, at a speed v' chosen between zero and V, depending on the product type and the product capacity to withstand the docking impacts, and
   a transfer movement, which is performed at the same time as said advancing movement by the second pusher at a speed V' equal to from about V to 1.2V.

3. The method for assembling products palletizable in layers as claimed in claim 1, further comprising,
   before transferring the rows of products between said preparation station and said preassembly station, at least one of positioning and orienting the products by placing some products at right angles in relation to other products, in accordance with a palletization layout.

4. The method as claimed in claim 1, wherein the row of products comprises products disposed traversely on the preparation station, with respect to a direction of a conveyor movement of the preparation station.

5. The method as claimed in claim 4, wherein the row comprises at least two products arranged in a single file disposed traversely on the preparation station, with respect to the direction of the conveyor movement of the preparation station.

6. The method as claimed in claim 1, wherein the transferring the formed layer includes moving the second pusher from an inactive position above the preassembly station into an active position above the preassembly station that is lower than the inactive position while the first pusher is retracting to the initial position.

7. The method as claimed in claim 1, wherein the transferring the formed layer comprises:
   transferring the formed row with the second pusher, while substantially contemporaneously transferring a new row of products by the first pusher onto the first position on the preassembly station.

8. An installation for implementing a method for assembling products palletizable in layers, each layer comprising a number of rows of products, the method comprising cyclically:
   transferring a first row of products between a preparation station for preparing the products and a preassembly station at a speed V;
   transferring a second row of products from the preparation station onto said preassembly station at the speed V, while substantially contemporaneously moving said first row onto a further position on the preassembly station, at a speed v chosen between zero and V, depending on at least one of a type of product, a product stability, and a product capacity to withstand docking impacts, to manage docking of the second row of products next to the first row of products positioned on the preassembly station;
   transferring, as required, another row of products onto said preassembly station, at the speed V, and moving the first row and the second row onto another further position on the preassembly station at the speed v between zero and V, to manage docking of the another row of products next to the second row of products positioned on the preassembly station; and
   when the number of rows is reached in order to obtain a layer, transferring the layer to a palletization station, on a deposition table;
   the installation comprising:
   at least one preparation station, which receives the products to be palletized arriving from a sorting belt;
   said preassembly station which receives subsequent rows of products from the preparation station so that the products are arranged in at least one row on a table to form a palletizable layer;
   said palletization station into which a deposition of the formed layer is performed and where a stacking of different layers of products is performed to form a pallet;
   a first pusher which is positioned in an initial position prior to the preparation station and transfers the rows of products from the preparation station onto a first position on the preassembly station at the speed V, by moving from the initial position onto a final position above the preassembly station which corresponds to a rear of the row positioned at the first position on the preassembly station;
   a second pusher which moves from a position above the preassembly station downstream from the first position into a new position above the preassembly station and transfers the formed layer from the preassembly station to the palletization station; and
   means for monitoring and measuring the position of said first and second pushers,
   wherein transfer speeds of the products are adjusted and synchronized in accordance with criteria characteristic of the products including the product stability to remain stable in space and the product capacity to withstand the docking impacts when the rows of products are docked next to each other.

9. The installation as claimed in claim 8, wherein said second pusher moves the formed layers between said preassembly station and a table of the palletization station, substantially contemporaneously with a new row being transferred by the first pusher to the first position on the preassembly station, and
   the first and second pushers are retractable in a height direction to move above the rows of products during a return travel movement.

10. The installation as claimed in claim 8, wherein said pre-assembly station has an endless belt, which is motor-driven to adjust the transfer speeds during transfers,
   which transfer speeds are determined depending on information provided by said monitoring and measuring means and are chosen depending on a nature of the products to be assembled, the product stability to remain stable in space, and the product capacity to withstand the docking impacts when one row of the products is docked next to other rows.

11. The installation as claimed in claim 10, wherein said preassembly station comprises:
   a flat bed on which an upper section of said endless belt rests and travels so that the products are disposed on a surface which is flat, providing the products with a higher stability and adequate grip such that the products are conveyed by said endless belt; and
   a trigger cell type sensor which is disposed at least at an entry point of the preassembly station and controls passing movements of said first and second pushers.

12. The installation as claimed in claim 10, wherein said endless belt of said preassembly station is a modular type belt made of thermoplastic material, and comprises:
   bar sections hinged about spindles which extend transversely with respect to a feeding direction of said endless belt, and
   an outer surface which receives and supports the products, and is a continuous, flat, and uniform surface.

13. The installation as claimed in claim 12, wherein said endless belt has an inner surface on which a toothing is formed around said spindles having a depth about a half of a thickness of the bar sections,
   the toothing allows said endless belt to be wound around smooth small-diameter rollers, situated at both ends of said preassembly table,
   said endless belt is driven by a driving member comprising a meshing drum on which said endless belt is wound over about a half of said meshing drum with a tensioning roller, and
   the drum has a diameter in a range of ten times of a pitch of said toothing.

14. The installation as claimed in claim 8, wherein said preparation station consists of a table formed by small-diameter motor-driven rollers,
   the table is arranged at an end of the sorting belt and is provided with at least one of pivots and travel stops which allow at least one of orientation, spacing, and fixing of the products in corresponding positions in a layer, and
   the corresponding positions of the products are determined by a palletization layout.

15. The installation as claimed in claim 8, wherein the preparation station comprises:
   a pivot which orients the received products based on a palletization layout; and
   a travel stop which separates the products from one another.

16. The installation as claimed in claim 8, wherein the second pusher is configured to move from the position above the preassembly station downstream from the first position to the new position above the preassembly station while the first pusher retracts to the initial position and the number of rows on the preassembly station is reached to form the layer.

17. An apparatus comprising:
   a preparation station which receives products to be palletized;

a first pusher positioned in an initial position prior to the preparation station and configured to transfer a row of products from the preparation station onto a first position on a preassembly station at a speed V, by moving from the initial position to a final position above the preassembly station that corresponds to a rear of the row at the first position on the preassembly station which receives subsequent rows of products from the preparation station at the speed V and moves each received row of products at a respective speed v chosen between zero and V while a next row of products is being received from the preparation station at the speed V, docks each subsequent row of products next to a preceding row of products already positioned on the preassembly station, and arranges the rows of products on a table to form a layer;

a second pusher which moves from a position above the preassembly station downstream from the first position to a new position above the preassembly station; and a palletization station into which the formed layer is transferred from the preassembly station by the second pusher.

18. The apparatus as claimed in claim 17, wherein the preparation station comprises:
   a pivot which orients the received products based on a palletization layout; and
   a travel stop which separates the products from one another.

19. The apparatus as claimed in claim 17, wherein the second pusher is configured to move from the position above the preassembly station downstream from the first position to the new position above the preassembly station while the first pusher retracts to the initial position and the number of rows on the preassembly station is reached to form the layer.

20. The apparatus as claimed in claim 17, wherein the second pusher is configured to transfer the formed layer from the preassembly station into the palletization station, while the first pusher transfers substantially contemporaneously a new row of products to the first position on the preassembly station.

* * * * *